Figure 1:
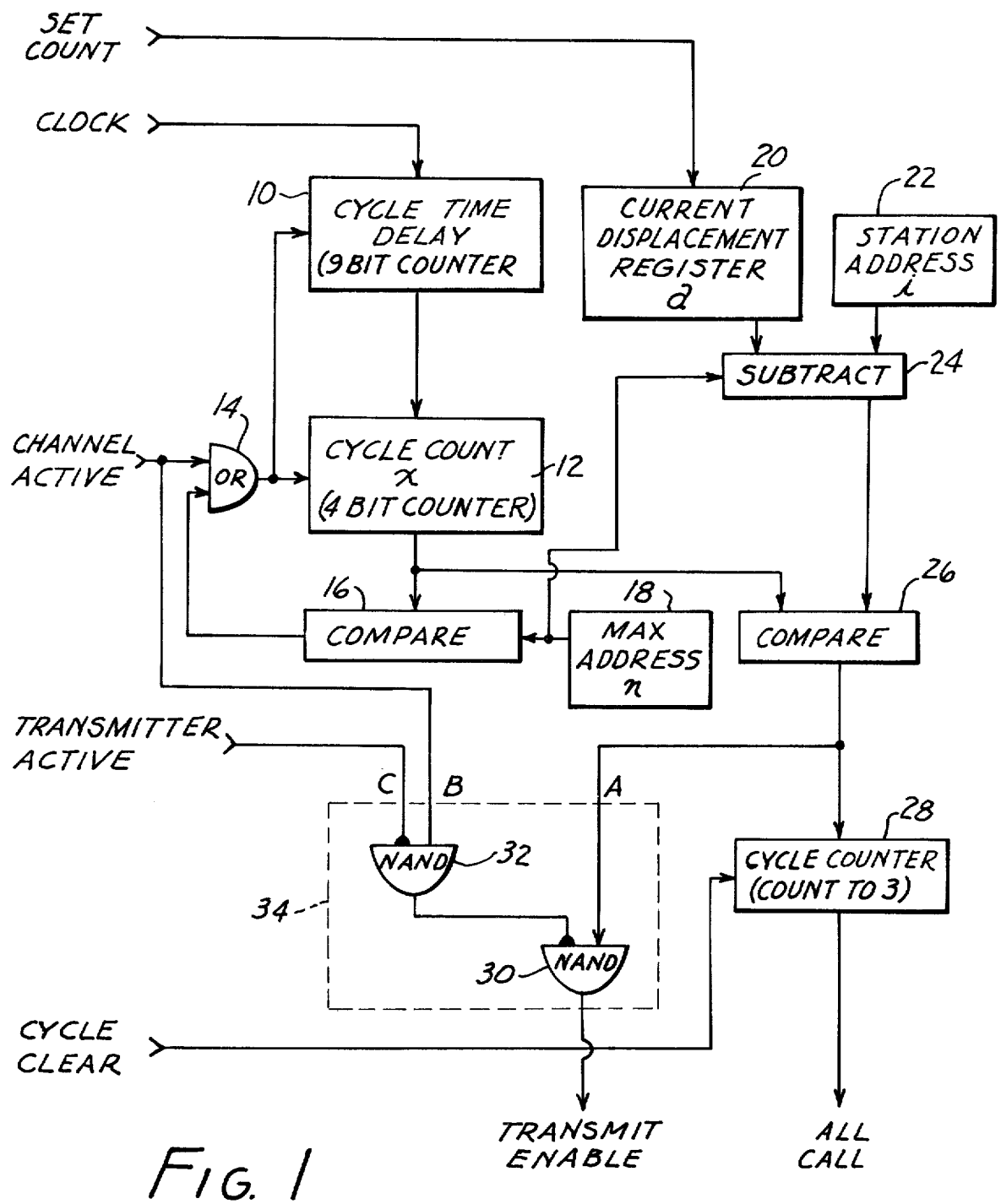

United States Patent [19]
Burke et al.

[11] 4,232,294
[45] Nov. 4, 1980

[54] METHOD AND APPARATUS FOR ROTATING PRIORITIES BETWEEN STATIONS SHARING A COMMUNICATION CHANNEL

[75] Inventors: Robert G. Burke, Santa Ana; Robert F. Martin, Villa Park, both of Calif.

[73] Assignee: Control Data Corporation, Minneapolis, Minn.

[21] Appl. No.: 34,236

[22] Filed: Apr. 30, 1979

[51] Int. Cl.³ .............................................. H04Q 9/00
[52] U.S. Cl. .............................. 340/147 LP; 364/200
[58] Field of Search .................................. 340/147 LP; 364/200 MS File

[56] References Cited

U.S. PATENT DOCUMENTS

| | | | |
|---|---|---|---|
| 3,573,856 | 4/1971 | Best et al. | 364/200 MS |
| 3,796,992 | 3/1974 | Nakamura et al. | 340/147 LP |
| 4,009,470 | 2/1977 | Danilenko et al. | 364/200 MS |
| 4,148,011 | 4/1979 | Mc Lagan et al. | 340/147 LP |

*Primary Examiner*—Donald J. Yusko
*Attorney, Agent, or Firm*—Robert M. Angus

[57] ABSTRACT

A method and apparatus for rotating priorities among stations on a communication channel, and particularly on a contention channel where a plurality of active stations are provided, each capable of seizing use of the channel. Counter means at each station contains an indication representative of the station having highest priority to the channel Each station establishes a priority rank for itself based upon the contents in the counter means. The indication is sequentially altered to provide priority to other stations. The priority indications in the counter means are synchronized each time a station seizes use of the channel, and may also be synchronized periodically if no station seizes use of the channel.

11 Claims, 2 Drawing Figures

METHOD AND APPARATUS FOR ROTATING PRIORITIES BETWEEN STATIONS SHARING A COMMUNICATION CHANNEL

This invention relates to a method and apparatus for eliminating conflicts on a communication channel, and particularly to a method and apparatus for sequentially allocating priority to each of a plurality of stations sharing a communication channel.

This application is related to application Ser. No. 903,345 for "Method and Apparatus for Eliminating Conflicts on a Communication Channel" by Eugene G. Blumke and Philip E. White filed May 5, 1978 and assigned to the same assignee as the present application, which is incorporated herein by reference.

A contention channel is a communication channel providing shared communications among a plurality of stations. Typically, the stations comprise components of a data processing system, such as processors, device controllers, etc. Typically, the contention channel is shared by a plurality of "active" stations, any of which can initiate communications; "passive" stations, namely those stations capable of responding when addressed but which cannot independently initiate an exchange of communications, may also be included.

In a pure contention channel, an active station transmits onto the channel whenever it has a message to send. One problem with sure pure channels resides in the fact that if two or more stations are ready to transmit over the same period of time, there will be a mutual garbling of messages as the messages overlap. While pure channels may be adequate for light traffic channels, the channels are not capable of being greatly expanded to serve more stations because the channels may not be capable of handling the increased traffic resulting from more stations. Further, the repeating of garbled messages tends to increase traffic on the channel, thereby increasing the likelihood of garbling messages.

To overcome some of the problems with pure contention channels it has been common to provide lock-out of all nontransmitting stations while the channel is active. Thus, "channel active" and "channel idle" signals are imposed on the channel, and any station ready to transmit will have to wait until the channel is idle before a transmission can be initiated. However, if two or more stations are awaiting a channel idle status, they will both seize the channel as soon as the channel becomes idle, thereby resulting in garbled messages and the necessity to repeat transmissions. To overcome this problem, it has been proposed to inhibit each station from seizing the channel for some predetermined period of time following channel idle status. By providing a different time delay for each station, the likelihood of conflict between two or more stations becomes quite remote. In effect, by allocating different time delays to the several stations, the stations have fixed orders of priorities with those stations having shorter time delays having greater priority over stations with longer time delays. For a more detailed discussion concerning prior communication systems, reference may be had to the aforementioned Blumke and White application. While for many applications it is possible to allocate less important stations to the lower priorities to thereby adequately serve all stations, such an arrangement may not be satisfactory in environments where some stations cannot be appreciably subordinate to other stations. In this respect, certain system designs may require each station to have substantially equal opportunity to seize use of the channel. Also, in extremely high traffic channels significant delays may occur before lower priority stations are able to seize the channel, as higher priority stations prevent such lower priority stations from being served.

It is, therefore, desirable to rotate the allocation of priorities between the stations, and it is a primary object of the present invention to provide a technique whereby the allocation of priorities of stations on a communication channel may be altered.

The aforementioned Blumke and White application overcomes the aforesaid problems by allocating a time slot for each station while inhibiting all other stations. The present invention concerns altering the time delays for each station to thereby alter the allocation of priorities.

It is therefore another object of the present invention to provide, for a contention channel having a plurality of active stations, each of which is capable of seizing use of the channel, a technique of altering the allocation of the priority of the stations by periodically changing the time delays for each station.

In certain communication channels the problems associated with priority allocation are overcome through use of interrogation and responding techniques whereby a central station interrogates (polls) each peripheral station in sequence to enable the polled station to transmit if ready. However, such arrangements are not well suited to situations where the peripheral stations themselves will exchange messages without interference or control from a central station. Further, the polling of the peripheral stations requires that each peripheral station respond to the interrogation of the central station, as opposed to peripheral stations seizing the channel when the station is ready to transmit and the channel is inactive. Accordingly, it is a further object of the present invention to provide a technique whereby priority between stations is allocated and the allocation of priority is sequentially altered, all without the control of interference of a central station.

In accordance with the present invention, conflicts on a communication or contention channel shared by a plurality of stations, each capable of seizing use of the channel, are minimized by providing a different time delay for each station after which that station is enabled to seize use of the channel. The time delay is provided by cyclic counter means which is continuously advanced in count. Register means is provided by storing a representation (e.g., address) of the identity of the one station having the highest priority. Means in each station establishes a unique priority rank for that station based on the representation stored in the register, the priority rank being related to a unique count. When the counter means advances to the count associated with that station's priority rank, the station is enabled to seize use of the channel.

One feature of the present invention resides in synchronizing the representation in all of said register means each time a station seizes use of the channel.

Another feature of the present invention resides in synchronizing the representation in all of said register means when one of the stations has been enabled a predetermined number of times without any of the stations actually seizing use of the channel.

Another feature of the present invention resides in the resetting of all of the counter means each time that a station seizes use of the channel, thereby assuring synchronism of the counter means.

In accordance with another feature of the present invention, the system can be operated with or without idle channel conflict suppression. When using idle channel conflict suppression, each station will be accorded a time slot, at a time dependent upon the priority rank, during which that station may seize use of the channel to the exclusion of all other stations. When operated without idle channel conflict suppression, a station may seize use of the channel any time after completion of its time delay.

Figure 2:
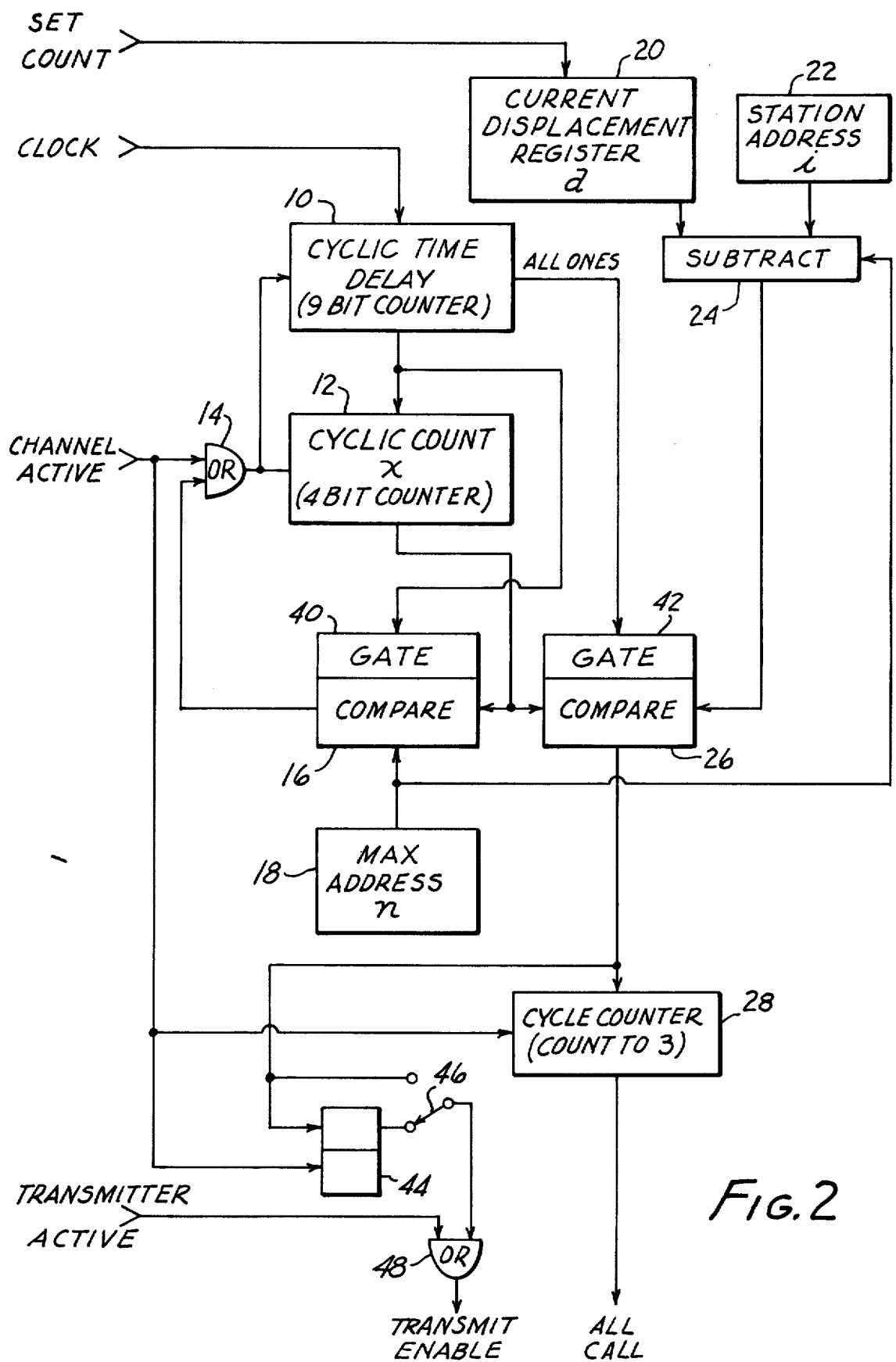

The above and other features of this invention will be more fully understood from the following detailed description and the accompanying drawing, in which:

FIG. 1 is a block circuit diagram of the priority allocation and control unit for a station of a contention channel in accordance with apparatus for carrying out the present invention; and FIG. 2 is a block circuit diagram of a modification of the apparatus shown in FIG. 1.

With reference to the drawings, which illustrate block circuit diagrams of the priority allocation and control unit for a single station of a contention or communication channel, a typical contention channel will include the communication channel and a plurality of stations, at least some of which are active stations; that is, stations which can initiate communications. A typical station may include, for example, a peripheral device, such as a memory or a disc drive for a data processing system as well as a device controller. The device controller provides the interface between the peripheral device and the contention channel. The controller has a unique address which, for example, may be represented in binary code (and in the example to be herein given it will be assumed that the address comprises a four-bit code, thereby permitting up to sixteen unique addresses). Since the peripheral devices, device controllers and communication channel are well known in the art, they are not shown in the drawings. Reference may be made to the aforementioned Blumke and White application for a typical configuration of the peripheral devices, controllers and communication channel, and particularly FIG. 3 thereof.

In accordance with the present invention, each station includes apparatus for priority allocation and control, an example of such apparatus being shown in the drawing and constituting the presently preferred embodiment of such apparatus.

As shown in FIG. 1 there is illustrated a counter 10 having an input from a clock and a carry output to cyclic counter 12. Counters 10 and 12 have reset inputs from OR gate 14 which in turn receives a channel active signal from the station controller and a signal from compare circuit 16. Counter 12 also provides a 4-bit output to compare circuit 16, whose other 4-bit input is received from register 18 which contains an indication of the maximum address (that is, the address of the station having the highest address).

Register 20 receives a 4-bit input from the controller to store the address or representation of the indication of the station having the highest priority. Register 22 contains the 4-bit address of the particular station. Subtract circuit 24 receives its input from registers 18, 20 and 22 and provides a 4-bit output to one input of compare circuit 26. The other input of compare circuit 26 is received from counter 12. Compare circuit 26 provides outputs to cycle counter 28 and to the AND input of NAND gate 30. NAND gate 32 receives its AND input from the channel active signal and its NOT input from the station transmitter controller. NAND gate 32 provides its output to the NOT input of NAND gate 30. NAND gate 30 provides a transmit enable output to the station controller, and counter 28 provides an all call signal output to the station controller.

For purposes of illustration, counter 10 may be a 9-bit counter and counter 12 may be a 4-bit counter. Alternatively, counters 10 and 12 may be replaced with a single 13-bit counter having only its four most significant bits providing inputs to compare circuit 16. Station address 22 and maximum address 18 may be contained in registers, but it is preferred that they are embodied in 4-bit hexadecimal manual switches to provide binary outputs representative of the local station address and the maximum number of stations on the channel, respectively. For example, if there are twelve active stations on the channel with addresses of 0000 through 1011, the maximum address 18 set in all stations will be 1100, whereas the local station address will be that of the respective local station.

For purposes of explanation, it will be assumed there are twelve active stations associated with the communication channel having addresses of 0000 through 1011 (0–11). Therefore, binary twelve (1100) is set in all maximum addresses 18. It is further assumed that all counters 10 and 12 are set to zero and that all registers 20 contain the address of the eighth station, which is binary 7 (0111). It will be assumed that the seventh, eighth and ninth stations are not ready to transmit (nor will be ready to transmit when accorded the opportunity to seize use of the channel), but that the tenth station is ready to use the channel.

Under the conditions as stated, and assuming the channel is inactive, subtract circuit 24 in station eight will note a zero difference between the contents of register 20 and the local address (all other subtract circuits will note different result), so subtract circuit 34 of the eighth unit will provide a zero binary signal to compare circuit 26 of the eighth station. In station nine, subtract circuit 24 subtracts the binary count in register 20 (assumed to be 0111) from the address of station nine (1000) and notes a plus one count. The binary signal (0001) is forwarded to compare circuit 26 of the ninth station. Likewise, in station ten, subtract circuit 24 notes a plus two difference and forwards a binary 0010 to its compare circuit 26. It will be appreciated that the subtract circuit 24 in each station produces a unique priority number j based upon the difference between the contents of register 20 (which contains the current displacement number d or address of the station currently having the highest priority) and the local station address i in hexidecimal switch 22. Thus, subtract circuit 24 determines j by $j = i - d$ (where $i \geq d$) and by $n - (d - i)$ (where $d > i$) where n is the number of stations on the channel. Thus, subtract circuit determines j by $$j = |i - d| \bmod n.$$

The module n count is supplied by the binary signal from maximum address 18. It will be appreciated that under the conditions stated, station seven has priority number of zero (0000), station eight has a priority number of one (0001), station nine has a priority number of two (0010), station ten has a priority number of three (0011) and so on through station six which has a priority number of eleven (1011).

The priority number j is forwarded to one input of compare circuit 26, whose other input is received from counter 12 (or the four most significant bits of a counter combining counters 10 and 12). It has been assumed that both counters 10 and 12 are set to zero (0000). Under these conditions, the count, x, in all counters 12 is forwarded to the respective compare circuit 26. However, since only station seven has a priority number, j, which matches the count x from register 12, only compare circuit 26 of station seven will pass a signal to cyclic counter 28 and to NAND gate 30.

It will be appreciated by those skilled in logic design that NAND gates 30 and 32 are connected as an INHIBITED AND-NOT gate 34, providing an output whenever a signal is present from compare circuit 26 and no signal is present from the channel active bus, or whenever all three input signals are present. More particularly, if the signal from compare circuit 26 is signal A, the signal from the channel active bus is signal B, and the transmitter active bus is signal C, gate 34 provides a logical output of $A\overline{B} + ABC$. Gate 34 provides a transmit enable signal to the station controller to enable the station to seize use of the channel. (As will be more fully explained hereinafter, the channel active signal is present whenever any station has seized use of the channel, and the transmitter active signal is present whenever the particular local station has already seized use of the channel.)

Since only station seven contains a priority number, j, which matches the count, x, in counter 12, only station seven sends a signal to counter 28 and gate 34. Since the channel is assumed not to be active, no channel active signal is present, so NAND gate 30 is activated to provide a transmit enable signal to station seven. Since it has been assumed that station seven is not ready to seize use of the channel, nothing further occurs.

The clocks connected to counters 10 are each preferably free running crystal controlled clocks at each station providing a 50 Megahertz output. (Alternatively, the clock signals could be provided via the communication channel, but that arrangement is not as preferable). As a result, counter 10 advances in count at the rate of 50 Megabits per second. Counter 10 is a 9-bit counter whose carry output is connected to counter 12. As a result, counter 10 provides a carry bit output at the end of each 256 cycles of the clock. Upon each carry output from clock 10, the count in clock 12 advances by one count. Hence, in the case where the count in counter 12 was 0000, upon a carry output from counter 10, the count in counter 12 advances to 0001, which matches the priority number, j, of station eight. Hence, the compare circuit 26 in station eight notes a comparison between the count x in its register 12 and the priority number j from its subtract circuit to cause gate 30 to provide a transmit enable signal to the station eight controller. Since station eight is not ready to seize use of the channel, nothing further occurs and the clock continues to advance registers 10 and 12 in count until counter 12 advances in count to 0010, which matches the priority number, j, of the ninth station. Since the ninth station is not ready to transmit, the process continues until the count in counters 12 advances to 0011, which matches the priority number of the tenth station.

Since the tenth station is ready to seize use of the channel, the tenth station controller responds to the transmit enable signal to impose a message and message carrier signal onto the channel. The carrier signal is received by all controllers to impose a "channel active" signal on the respective OR gates 14 to reset all counters 10 and 12 to zero. Counters 10 and 12 are held to a zero count as long as the channel active signal is present. All stations, other than the one whose priority number, j, is zero will be prevented from being enabled by virtue of a non-comparison by their respective compare circuits 26. Upon seizing the channel, station ten will provide a "set count" signal for insertion into current displacement register 20. As will be seen hereinafter, the "set count" signal may be the address of the station seizing use of the channel (station ten, in this case), in which case only station ten will continue to receive a transmit enable signal. (As will be more fully understood hereinafter, station ten can be programmed to insert a different station address into all registers 20, in which case the gate circuit 34 will inhibit a transmit enable to the station having priority.)

It is evident that upon seizing use of the channel, the resetting of counters 10 and 12 assure synchronization of all counters. When a seizing station discontinues use of the channel, the channel active signal is dropped thereby permitting the clock to again advance the counts in counters 10 and 12 as herein described. Hence the process will continue.

It will be readily appreciated that once a station seizes use of the channel, the channel is entirely dedicated to that station, but only for so long as that station requires use of the channel. A seizing station might, for example, transmit a message to another station, hold the channel until the receiving station transmits a reply, and continue to hold the channel until the reply message is verified for accuracy, all as well-known in the art. Thus, if a seizing station initiates communication with another station, the second station does not impose its address onto the channel to cause any change in the contents in counters 16. (In this respect, the responding station may be an active or a passive station and may or may not have an address. Further, if the responding station is a passive station, it would not have the apparatus described above.)

When the tenth station has completed its use of the channel (for example by successfully receiving a reply from an interrogated station), it drops the message carrier signal from the channel, thereby reverting the channel to a channel idle status. Thus counters 10 and 12 are permitted to restart their respective counts. In the example given wherein station ten placed its own address in all registers 20, station ten will have the highest priority, station eleven will have the next highest priority, etc., with station nine having the lowest priority.

When the counts in counters 12 reach that of the total number of stations on the channel (indicative of the total number of devices on the channel—which in the example is assumed to be 1100), comparator 16 notes the comparison with the value set by maximum address 18 so as to reset all counters 10 and 12 to 0000. This assures that time will not be wasted giving priority to nonexistent stations. (If there are sixteen stations on the channel, compare circuit 16 and maximum address 18 may be eliminated, as synchronization of the counters will be assured as hereinafter explained.)

Each time a particular station detects a compare between counter 12 and the priority number, the count in the associated cycle counter 28 advances by one. Each time a station seizes use of the channel, all controllers impose a "cycle clear" signal onto counters 28 to thereby reset all counters 28 to zero. However, if all stations are inactive and therefore are given the opportunity to seize the channel but do not, each counter 28 is advanced by one each time the corresponding station was enabled. If the count in one of the counters 28 advances to three (indicative of no activity on the channel for two full cycles of allocation of priority to each station), the counter 28 reaching two initiates an "all call" signal to the peripheral device controller associated with that counter 28 forcing that controller to seize use of the channel. The station seizing the channel will transmit its address via the "set count" lines to all registers 20 to synchronize the addresses in registers 20 and will force all counters 10 and 12 to the reset to zero as heretofore described. Thus, the synchronization of the counts in counters 10 and 12 are assured. Therefore, it will be appreciated that resynchronization of the counts in all counters 10 and 12 occurs each time a station seizes the channel, and in no event less often than every third principal cycle.

It will be appreciated to those skilled in the art that the number of stations can be increased above sixteen given in the example by increasing the size of counters 12 and by increasing the capacity of compare units 16 and 26 and registers 20. For example, up to 32 stations can be accommodated by a five-bit code or 64 stations by a six-bit code.

It will be appreciated that the clock associated with each counter 10 may be a local clock unit at each station, or may be a master clock for the entire channel. Preferably, however, there is a separate clock for each station contained in the station's control unit. In any case, the clock pulses provided to the counters 10 should be substantially synchronized and at the same rate.

Compare circuit 26 may be operated in either of two modes: one in which an output signal is provided only when a comparison is detected (i.e., when $x=j$, and the other in which an output signal is provided whenever the number in counter 12 equals or exceeds the priority number ($x \geq j$). In the case where compare circuits 26 are arranged to provide an output only when $x=j$, the arrangement is such as to provide idle channel conflict suppression, and there can be no conflict between stations. In essence, when operated in this mode, each station can seize use of the channel only when the number in its counter 12 equals the priority number. As a result, each station has its own unique time slot during which it can seize use of the channel. In the case where compare circuits 26 are arranged to provide outputs whenever $x \geq j$, the arrangement is such as to not provide idle channel conflict suppression. In this case a station may seize use of the channel anytime after its priority number is reached in counter 12. Thus, conflicts are possible on an idle channel only in the unlikely event that two stations, which have already been accorded priority, happen to be made ready to seize use of the channel simultaneously. Idle channel conflict suppression offers the assurance of no conflicts on the channel, but requires dedication of the channel to the successive stations. Without idle channel conflict suppression, priorities are allocated and rotated, and any station can, after a time delay dictated by counter 12, be accorded use of the channel, but conflicts can occur as herein described. However, the present invention permits communication with or without idle channel conflict suppression, in accordance with the design of the system.

FIG. 2 illustrates a modification of the present invention and, particularly, it illustrates the presently preferred embodiment of the present invention. The apparatus shown in FIG. 2 is essentially the same as that shown in FIG. 1, except for the inclusion of gates 40 and 42, the substitution of flip-flop 44, switch 46 and OR gate 48 for gate circuit 34, and the connection of the reset of cycle counter 28 to the channel action signal rather than the cycle clear signal. Also, instead of compare circuits 26 providing a steady output (i.e., by setting a flip-flop) for the mode without idle channel conflict suppression, compare circuits 26 provide outputs only when a comparison is made and gated by gate circuit 42.

Gate 40 is connected to the carry output of counter 10 and enables compare circuit 16 to compare maximum address n with count x only when a carry output occurs from counter 10 (i.e., when counter 10 is zero). Also, gate 42 is connected to counter 10 to enable compare circuit 26 to compare count x with subtract result j only when counter 10 contains all binary ones. Hence, there can be no conflict between the comparators, and the risk of error occurring as the counts in counter 12 changes is minimized.

As shown in FIG. 2, counter 36 may be reset to zero by the channel active signal, thereby affectuating reset of all counters 36 whenever the channel is active. If reset of counters 36 are affectuated in this manner, the cycle clear signal may be eliminated.

As shown in association with OR gate 48, the transmitter active signal from the station's transmitter is fed through the OR gate 48 to provide the station's transmit enable. Thus, as long as the station is transmitting, the transmit enable signal is provided. The circuitry associated with flip-flop 44 and switch 46 provide selective operation between the modes of with and without idle channel conflict suppression. As heretofore explained, idle channel conflict suppression occurs only when compare circuit 26 determines that $x=j$ and the station's transmitter is enabled only when $x=j$. If the station transmitter is enabled and held enabled when and after compare circuit 26 detects $x=j$ (that is, whenever $x \geq j$), there is no idle channel conflict suppression.

With switch 46 in the position shown in the drawing, the station is in the mode without idle channel conflict suppression. If no station seizes use of the channel before a particular station's comparator 26 detects $x=j$, that station's flip-flop 44 is set (store) to provide a continuous output through switch 46 to OR gate 48 to provide a transmit enable signal. The transmit enable signal holds the station enabled to transmit until the channel subsequently becomes active and flip-flop 44 is reset to the opposite condition. It is possible, in idle channels, for many or all stations to become enabled so that the first which subsequently becomes ready to transmit immediately seizes use of the channel. When the channel becomes active, the channel active signal resets flip-flops 44 to remove the signal from OR gate 48.

With switch 46 in the position opposite that shown in FIG. 2, the unit is in the mode with idle channel conflict suppression. Thus, compare circuit 26 provides an output to OR gate 48 through switch 46 when $x=j$, thereby providing a transmit enable signal only when $x=j$.

If it is desired to remove the selectibility feature of switch 46, a unit to be operated in the mode with idle channel conflict suppression could have a direct connection between the output of compare circuit 26 and the input of OR gate 48, and flip-flop 44 and switch 46 could be eliminated. A unit permanently operated in the mode without idle channel conflict suppression could have switch 46 eliminated and a direct connection between the set side of flip-flop 44 and OR gate 48 be substituted (electrically identical to the switch position shown in FIG. 2).

One feature of the present invention resides in the fact that when a station seizes use of the channel, it inserts an address into all displacement registers 20. While the foregoing description has been directed to the situation wherein the address inserted into the register 20 is the address of the seizing station (in which case the gate circuit 34 may be eliminated as described above). However, the address to be inserted in registers 20 may be any address desirable. For example, in the case where the address in registers 20 was that of the seventh station, when a station seizes use of the channel, it can be programmed to insert the next station address (i.e., that of the eighth station) into the register 20. Thus in the example given where the tenth station seized use of the channel, it could be programmed to insert the next higher address of that previously in register 20, so station ten would add one to the address of station seven (which was in register 20) and transmit the new address (that of station eight) onto the channel for input into all registers via the set count input. In this case, since when station ten seized use of the channel the counters 12 were reset to zero, it is possible for station eight (which will have the highest priority when the channel is relinquished) to attempt to seize use of the channel. This is prohibited by NAND gate 30 being inhibited from operation by the presence of the channel active signal.

Another feature concerning insertion of different addresses into registers 20 resides in retransmit features. In this respect, if instead of inserting its own address in all registers 20 the seizing station inserts the next smaller address (i−1) into all registers 20, the seizing station will have second priority upon relinquishment of the channel. Hence, in the example, station ten will insert the address of station nine into all registers 20 so that upon relinquishing the channel station ten will again be enabled to use the channel immediately (unless, of course, if station nine becomes ready to use the channel).

As one skilled in logic design can readily determine from an inspection of FIG. 1, gate 34 may be replaced with a NAND gate whose NOT input is connected to the channel active signal. However, if it is desirable to permit some stations to transmit their own address for insertion into registers 20 and permit other stations to transmit other addresses, the gate circuit 34 shown in the drawing provides the greatest versatility. In the case where the seizing station transmits some other address, all stations are inhibited by virtue of either a lack of compare signal from the comparator 26 or an inhibit by virtue of the presence of a channel active signal. (Since only that non-transmitting station whose address was transmitted has highest priority, NAND gate 32 will be operated by the channel active signal in all but the seizing station to provide an inhibit signal to gate 30. When the channel becomes de-active, the station whose address was inserted into the registers 20 will have the highest priority.) In the case where the seizing station transmits its own address (so it is the only station capable of being enabled after reset of counter 12), the transmit enable signal is held by virtue of a signal from the seizing station's transmitter to the NOT side of its own gate 32 to inhibit gate 32, thereby permitting gate 30 to continue to operate. Additionally, it may be desirable to eliminate the "clear cycle" reset of counter 28 and permit it to be reset by direct operation of a transmitter active signal.

It will be recognized that the distance between stations connected to a channel may be quite large (e.g., on the order of several thousand feet). Therefore, signal propagation delays must be accounted for in the design of the system. Further, since the channel active signal from a seizing station may be received at different times by the other stations (due to signal propagation delays), there must be sufficient time between changing the priority allocation to permit all stations to receive transmissions on the channel before allocating the channel to another station.

It is evident that during start-up, the counters in the stations synchronized to the station employed in the start-up lag the counters in the initiating station by a time delay representative of the propagation delay. Further, when a station seizes use of the channel or initiates an "all call" signal, as heretofore described, the counters in the other stations lag that of the seizing station by the propagation delay. Therefore, it is apparent that the maximum delay on the channel between transmission by one station and reception by another is 2t where t is the propagation time between the two "worst case" stations. (This occurs because the seizing station's counters might already lag that of the receiving station by the propagation delay, t, so that when the message carrier or "all call" signal is received by the receiving station, it "sees" a delay of 2t.) Therefore, the time period between priority allocation should be greater than 2t, and hence the time periods between successive priority allocations should be 2t plus the maximum amount of drift which may occur over the maximum time period between "all call" sequences.

It is possible to shorten the delay by having each station sense the channel active status and the station which generated it. Each station could, for example, calculate the probable propagation delay in receiving the carrier signal and reset its counter accordingly.

The present invention thus provides a system for allocating priorities between stations of a communication channel whereby the priority allocation is sequentially altered, all without the control of or necessity for, a central station. The technique is effective in operation and overcomes many of the difficulties associated with prior contention channels. Particularly, with the present invention, it is now possible to provide contention channels with greater traffic density without the risk of garbled messages and without further priorities which might tend to subordinate certain stations to low priorities.

If it is desired that certain stations have a fixed priority over other stations, it is possible to accord such priority by fixing a shortened predetermined time delay with such stations and permitting the time delays of the lower priority stations to be rotated (allocated) with the longer time delays.

This invention is not to be limited by the embodiment shown in the drawing or described in the description, which is given by way of example and not of limitation, but only in accordance with the scope of the appended claims.

What is claimed is:

1. Apparatus for allocating use of a communication channel shared by a plurality of stations, each station having a respective address and each station having a controller responsive to an enable signal to enable the station to seize use of the channel, said apparatus comprising, at each station: register means for storing a representation of the address of the station having the highest priority; means responsive to the representation stored in said register means and to the address associated with the respective station for establishing a priority number for the respective station; cyclic counter means for storing a count number; clock means for continuously advancing the count number in said counter means; and compare means responsive to a comparison between said count number and said priority number for providing said enable signal to said controller.

2. Apparatus according to claim 1 further including means for resetting said counter means whenever a station seizes use of the channel.

3. Apparatus according to claim 1 wherein said compare means includes store means for maintaining said enable signal after said comparison has been made, whereby said apparatus does not have idle channel conflict suppression.

4. Apparatus according to claim 3 further including select means for selectively operating said store means whereby said apparatus is selectively operable in a mode with or without idle channel conflict suppression.

5. The method of reducing conflicts on a communications channel shared by a plurality of stations, each station having controller means responsive to an enable signal to enable the station to seize use of the channel, said method comprising: determining, for each station, a mutually exclusive priority number; advancing a count in a counter means from a number not larger than said priority number, and providing said enable signal when the count reaches said priority number.

6. The method according to claim 5 wherein each station has a respective address and register means at each station for storing the address of the one station having the lowest priority number, said method further including establishing the priority number for each station from the relationship $$j = \mathrm{mod}\, n |i - d|$$

where n is the number of stations on the channel, i the local station address, and d is the address stored in said register means.

7. The method according to claim 6 wherein the address stored in each of said register means is changed by a station seizing use of the channel.

8. The method according to claim 7 wherein whenever a station seizes use of the channel, it causes its own address to be stored in all of said register means.

9. The method according to claim 7 wherein whenever a station seizes use of the channel, it causes a predetermined address to be inserted in all of said register means.

10. The method according to any of claims 6–9 wherein said enable signal is provided whenever $x = j$, where x is the count in said counter means.

11. The method according to any of claims 6–9 wherein said enable signal is provided whenever $x \geq j$, where x is the count in said counter means.

* * * * *